C. JULIER.
CAR FENDER.
APPLICATION FILED NOV. 11, 1911.
1,053,827.
Patented Feb. 18, 1913.
2 SHEETS—SHEET 1.
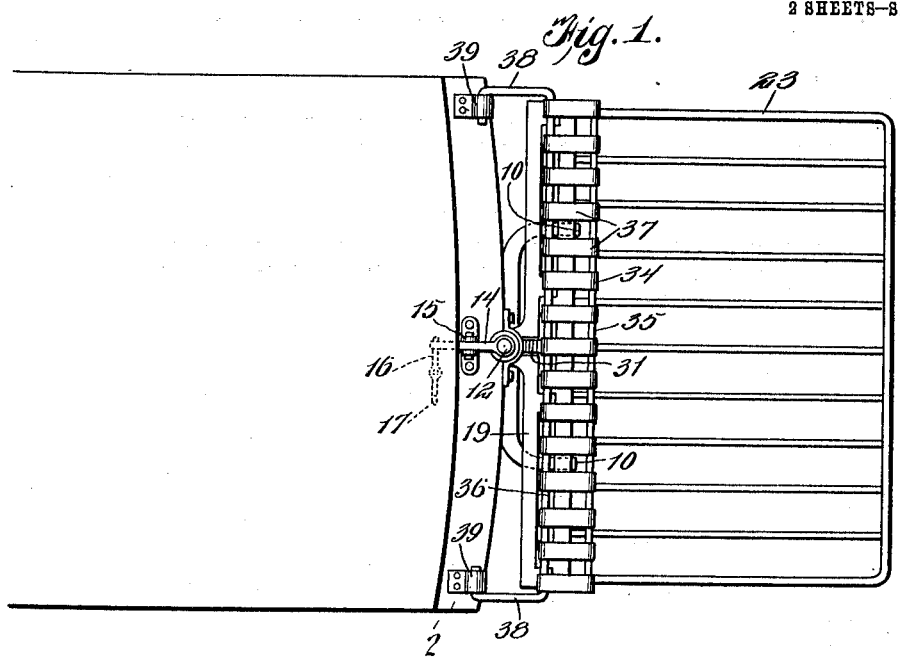
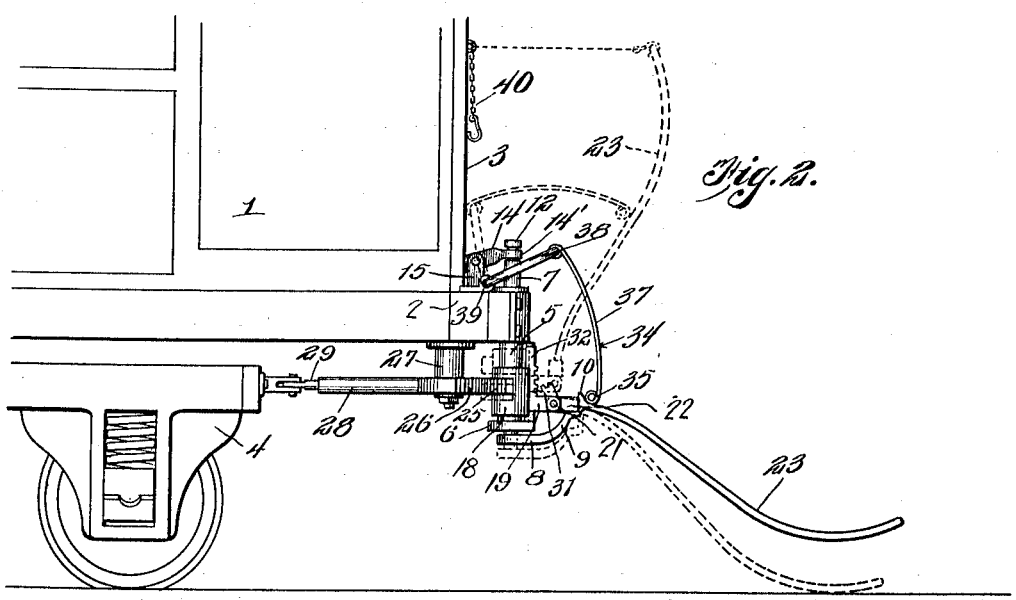
Witnesses
Louis R. Heinrichs
C. C. Hines
Inventor
Camilla Julier
By Victor J. Evans
Attorney C. JULIER.
OAR FENDER.
APPLICATION FILED NOV. 11, 1911.
1,053,827.
Patented Feb. 18, 1913.
2 SHEETS—SHEET 2.
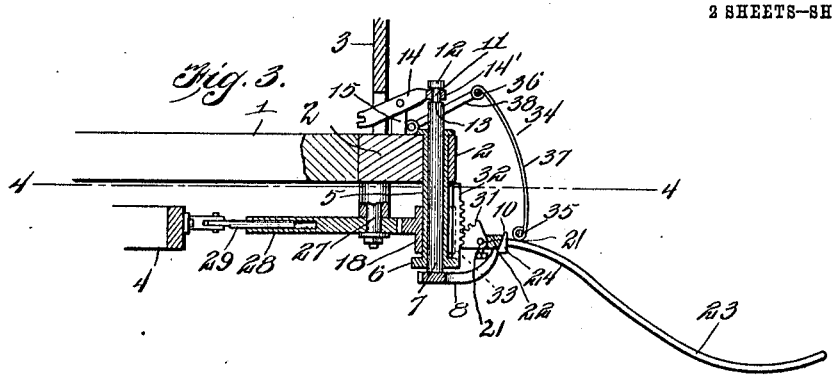
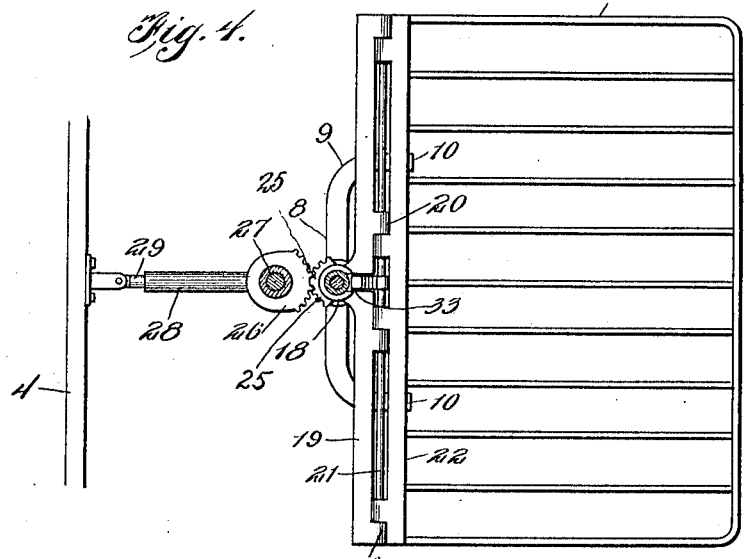
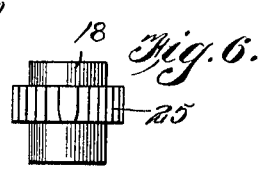
Witnesses
Louis R. Heinrichs
C. C. Hines
Inventor
Camilla Julier
By Victor J. Evans
Attorney

UNITED STATES PATENT OFFICE.

CAMILLA JULIER, OF DAVENPORT, IOWA.

CAR-FENDER.

1,053,827.  Specification of Letters Patent.  Patented Feb. 18, 1913.

Application filed November 11, 1911. Serial No. 659,689.

*To all whom it may concern:*

Be it known that I, CAMILLA JULIER, a citizen of the United States, residing at Davenport, in the county of Scott and State of Iowa, have invented new and useful Improvements in Car-Fenders, of which the following is a specification.

This invention relates to car fenders, and one of the objects of the invention is to provide a fender which is pivotally mounted on the car body and geared to the car truck to swing therewith, so that it will positively follow the line of the track.

A further object of the invention is to provide a construction of connecting gearing between the fender and truck whereby the fender is adapted to have easy swinging movement, and whereby in the event of the car jumping the track and the truck and fender being turned too far the connection between said truck and fender will be released so as to avoid liability of injury thereto and to the coupled parts.

A still further object of the invention is to provide a fender which when arranged at the rear of a car may be turned up to an inoperative position, and the gearing between the same and the truck simultaneously thrown out of action, so as to allow the truck to have movement without turning the fender.

A still further object of the invention is to provide simple and effective means under control of the motorman for dropping the fender in order to prevent a person from being run down by the wheels of the car, and to provide means whereby when the fender is raised or dropped the actuating gearing between the same and the truck will be thrown out of operation, while at the same time the elements thereof will be maintained in registering relation for subsequent accurate connection.

A still further object of the invention is to provide a supplemental fender for preventing a person caught by the main fender from being injured by the bumper of the car, and to provide simple and effective means whereby both fenders may be held in an inoperative or raised position.

With these and other objects in view, the invention consists of the features of construction, combination and arrangement of parts, hereinafter fully described and claimed, reference being had to the accompanying drawings, in which:—

Figure 1 is a top plan view of one end of a street car showing my invention applied thereto. Fig. 2 is a side elevation of the same, showing in full and dotted lines the fenders in their normal, dropped and elevated positions. Fig. 3 is a vertical longitudinal section, showing the main and supplemental fenders in normal position. Fig. 4 is a sectional plan view on the line 4—4 of Fig. 3. Figs. 5 and 6 are detail views of the gear segments.

Referring to the drawings, 1 designates an end portion of a street railway car, 2 the bumper thereon, 3 the dash, and 4 the pivoted or swiveled wheel truck at such end of the car, all of which parts may be of any ordinary or preferred construction.

Bolted or otherwise suitably secured to the bumper is a fixed hollow shaft or bearing tube 5, which depends below the bottom of the car, and carries at its lower end a supporting collar or flange 6. Through this shaft or bearing tube extends a rotary and vertically sliding inner tube or shaft 7 which projects at its lower end below the collar or flange 6 and carries a bracket 8 having forwardly and outwardly inclined or diverging arms 9, upturned and provided with beveled engaging fingers 10 at their free ends. The upper end of the shaft 7 is provided with a reduced portion or journal 11 to which is applied a head or nut 12, and at the base of which is arranged a shoulder 13. This reduced end or journal 11 passes through and is loosely engaged by an eye or loop 14' on the forward end of a lever 14 pivoted intermediately to a bracket 15 on the bumper, the rear end of which lever extends inwardly above the adjacent platform through a slot in the dash and is bifurcated or forked to receive one end of a pivoted latch 16 having an upturned projection 17 at its opposite end. The shaft 7 is free to rotate with the fender in the shaft 5 and eye 14', and is adapted to be held elevated by depressing the inner end of the lever 14, so as to cause the eye 14' to lift upward on the head 12, in which elevated position said rotary and slidable shaft may be locked by the latch 16 to hold the fender elevated. The motorman by kicking the projection 17 to release the latch may permit the shaft 7 to slide downward in the tube or shaft 5, so that the fender will drop by gravity to guarding position, as hereinafter described.

Arranged to rotate and slide longitudinally upon the shaft or tube 5 is a hub or sleeve 18 carrying a transverse supporting bar 19 provided with bearings 20, in which is journaled a cross rod or shaft 21, to which is fixed the transverse head bar or rail 22 of the main fender 23, whereby said fender is mounted to swing laterally and vertically. The said bar 22 is provided with beveled surfaces 24 adapted to be engaged by the fingers 10, the bar being arranged to rest normally on the arms 9 of the bracket 8, whereby the fender is supported at a suitable elevation above the track-way. The hub or sleeve 18 is provided with a series of gear teeth 25, forming a gear segment, which meshes with the teeth of a gear segment 26 journaled on a rod or bolt 27 depending from the platform of the car. To said gear segment 26 is secured a tube or sleeve 28 which slidably receives the forward end of a link or rod 29 fulcrumed to swing laterally upon the adjacent truck 30 of the car. In the travel of the car along the track, the described gearing connecting the fender and truck communicates motion to the fender to cause it to swing laterally in the same direction as the truck when the car rounds a curve, by which the fender is adapted to always follow the line of the track. The sleeve 28 and rod 29 form a telescopic pivotal connection between the gearing and truck, whereby ease of motion is insured. If the car should jump the track and the truck turn to an excessive degree, the rod 29 will be withdrawn from engagement with the sleeve 28, thus disconnecting the truck from the gearing, whereby liability of damage to the gearing or fender is obviated. The said parts 28 and 29 thus also provide an automatically releasable connection between the gearing and truck for the purpose set forth.

The fender 23 is adapted to be swung upwardly to an inoperative position and held in such position when arranged upon the rear end of a car, and when adjusted upwardly is adapted to withdraw the gear segment 25 from engagement with the gear segment 26, in order to allow the truck to turn independently of the fender. To this end, the rod or shaft 21 has fixed thereto a gear segment 31, which meshes with a rack bar 32 engaging a guide groove 33 in the front of the sleeve 18 and arranged between and normally held from endwise movement by the flange or collar 6 and the bumper 2 or one of the parts carried thereby. Hence when the fender is swung upwardly the gear segment 31 will travel on the rack bar and transmit upward sliding motion to the sleeve 18, whereby the gear segment 25 will be elevated above the plane of the gear segment 26. When the fender is released and adjusted downward to normal guarding position the gear segment 31 will travel down the teeth of the rack bar and return the sleeve to normal position, thus again bringing the gear segments 25 and 26 into engagement with each other. In order, however, to insure correct alinement of the gear segments 25 and 26 and their proper engagement with each other, when the fender is turned up or dropped to safety position, the space between the central teeth of the gear segment 26 is made of greater width than the spaces between the remaining teeth of said segment, while the central tooth of the gear segment 25 is arranged to extend above and below the segment, its upper and lower ends being tapered so as to guide it into engagement with the said central teeth of the gear segment 26 in resetting the gearing for operation, as will be readily understood.

Arranged above the main fender 23 is a curved supplemental fender 34 formed of rods or pipes 35 and 36 and a series of yielding strips 37 adapted to afford a spring buffing action. The rod 36 has its ends bent to form crank arms 38 engaging bearings 39 on the bumper, whereby the supplemental fender may be swung upward to a substantially horizontal inoperative position and downward to a substantially vertical position over the rear portion of the main fender and in advance of the bumper, to prevent a person caught by the main fender from coming in contact with the bumper. It will be understood from the foregoing description, that the main fender may be dropped down upon the trackway at any time by the motorman, through the simple process of releasing the latch 16, whereupon the fender will drop by gravity. A chain or other suitable flexible connection 40 is attached to the dash of the car and carries at its free end a hook or other engaging member for engagement with the upturned main fender, whereby both fenders may be held in an inoperative position, as shown in Fig. 2.

From the foregoing description, taken in connection with the accompanying drawings, the construction and mode of operation of my improved fender will be readily understood, and it will be seen that the invention provides a fender which accomplishes in a simple and efficient manner the objects sought.

It will, of course, be understood that various modifications in the construction and arrangement of parts may be made, within the scope of the invention defined by the appended claims, without departing from the spirit or sacrificing any of the advantages thereof.

Having thus described the invention, what I claim as new is:

1. The combination with a car having a pivoted truck, of a laterally swinging fender, gearing for swinging said fender from the truck, and a connection between the gearing and truck operative under the swinging movement of the truck to disconnect the gearing from the truck when the latter swings beyond a prescribed degree.

2. The combination with a car having a pivoted truck, of a laterally swinging fender, actuating gears carried by the fender and car, and a connection between the truck and gear carried by the car for operating the gears when the truck swings, said connection embodying members adapted for separation when the truck swings beyond a prescribed degree.

3. The combination with a car having a pivoted truck, of a laterally swinging fender, a gear carried by the fender, a gear carried by the car and meshing with the first-named gear, and a pivotal telescopic connection between the second-named gear and truck operative to disconnect said gear from the truck when the latter swings beyond a prescribed degree.

4. The combination with a car having a pivoted truck, of a laterally and vertically swinging fender, a gear carried by the fender, a gear carried by the car and meshing with the first-named gear, means for releasing the gears from engagement when the fender is raised or lowered from its normal position, and a connection between the truck and gear carried by the car, said connection being operative to release said gear from engagement with the truck when the latter swings beyond a prescribed degree.

5. The combination with a car having a pivoted truck, of a fender pivoted to swing vertically and laterally, means for holding the fender elevated in normal position and dropping it to guarding position, a gear carried by the fender, a gear meshing therewith and coupled to the truck, and means for throwing said gears out of and into swinging engagement when the fender is swung vertically out of normal position and returned to normal position respectively.

6. The combination with a car of a fender pivoted to swing laterally and vertically, means operated by the truck for swinging the fender laterally, said means embodying intermeshing gears, means for raising and depressing one of said gears when the fender is swung vertically, means for holding the fender in normal guarding position, and means for dropping said fender for operation.

7. The combination with a car fender having a pivoted truck, of a fender pivoted to swing laterally and vertically, gearing between the truck and fender embodying a pair of intermeshing gears, one of said gears being adjustable into and out of engagement with the other, means for adjusting said gear when the fender is swung vertically, means for supporting the fender in normal position, and means for releasing the holding means to permit the fender to drop.

8. The combination with a car having a swinging truck, of a fender pivoted to swing laterally and vertically, means for holding the fender in normal and inoperative positions, means for releasing the fender when in normal position to adapt it to drop, gearing connecting the fender with the truck and adapting it to swing therewith, said gearing embodying intermeshing gears, one of said gears being slidable vertically into and out of engagement with the other gear, a rack and pinion for shifting said gear when the fender is swung vertically, and means for supporting the fender in normal position and releasing it to permit it to drop.

9. The combination with a car having a swinging truck, of a stationary guide tube mounted on the car, a gear mounted to slide and rotate on said tube, a fender mounted to rotate laterally with the gear and pivoted to swing vertically, gearing between the fender and gear for sliding said gear when the fender is raised and lowered, a gear connected with the truck and meshing with the first-named gear, a rod slidable through the guide tube, a bracket carried by said rod to support the fender in normal position, and means for holding said rod in an elevated position and releasing it to permit the fender to drop.

In testimony whereof I affix my signature in presence of two witnesses.

CAMILLA JULIER.

Witnesses:
ROBERT L. FLOYD,
CLARENCE T. LINDLEY.

Copies of this patent may be obtained for five cents each, by addressing the "Commissioner of Patents Washington, D. C."